(12) United States Patent
Zaourar-Michel (10) Patent No.: US 10,546,255 B2
(45) Date of Patent: Jan. 28, 2020

(54) EFFICIENT OPTIMIZATION OF SCHEDULES IN A PUBLIC TRANSPORTATION SYSTEM

(71) Applicant: Conduent Business Services, LLC, Dallas, TX (US)

(72) Inventor: Sofia Zaourar-Michel, Grenoble (FR)

(73) Assignee: Conduent Business Services, LLC, Florham Park, NJ (US)

( * ) Notice: Subject to any disclaimer, the term of this patent is extended or adjusted under 35 U.S.C. 154(b) by 264 days.

(21) Appl. No.: 15/587,761

(22) Filed: May 5, 2017

(65) Prior Publication Data

US 2018/0322441 A1    Nov. 8, 2018

(51) Int. Cl.
*G06Q 10/06* (2012.01)

(52) U.S. Cl.
CPC .............................. *G06Q 10/063116* (2013.01)

(58) Field of Classification Search
CPC .............................................. G06Q 10/063116
See application file for complete search history.

(56) References Cited

U.S. PATENT DOCUMENTS

| | | | |
|---|---|---|---|
| 8,645,050 B2* | 2/2014 | Gontmakher | G08G 1/127 340/994 |
| 8,849,689 B1* | 9/2014 | Jagannathan, Sr. | G06Q 10/1095 705/7.12 |
| 9,117,223 B1 | 8/2015 | Handel et al. | |
| 9,117,372 B2 | 8/2015 | Koth | |
| 9,177,472 B2 | 11/2015 | Kim et al. | |
| 9,185,068 B2 | 11/2015 | Obradovich et al. | |
| 9,195,953 B2 | 11/2015 | Borgerson et al. | |
| 9,196,157 B2 | 11/2015 | Hardin et al. | |
| 9,217,647 B2 | 12/2015 | Pech et al. | |
| 9,261,374 B2 | 2/2016 | Mundinger et al. | |
| 9,389,086 B2 | 7/2016 | Hashem et al. | |
| 9,451,019 B2 | 9/2016 | Herz et al. | |
| 9,460,423 B2 | 10/2016 | Fitzpatrick et al. | |
| 9,528,840 B2 | 12/2016 | Kim et al. | |
| 9,778,051 B2* | 10/2017 | Vo | G01C 21/3446 |
| 2007/0136118 A1* | 6/2007 | Gerlach | G06Q 10/06 705/7.21 |

(Continued)

OTHER PUBLICATIONS

Feo, T. A., Greedy Randomized Adaptive Search Procedures, Journal of Global Optimization (1995) 6:109-134.

(Continued)

*Primary Examiner* — Sujay Koneru
(74) *Attorney, Agent, or Firm* — Kermit D. Lopez; Luis M. Ortiz; Ortiz & Lopez, PLLC (57) ABSTRACT

Methods and systems are disclosed for optimizing public transportation schedules. Shifts from current schedules associated with a public transportation system can be evaluated. The impact on waiting times can then be determined, based on evaluating the shifts from the current schedules. Schedules associated with the public transportation system are then optimized based on the impact on the waiting times. Public transport schedules can thus be optimized by minimizing the waiting time during, for example, transfers. Using ticket validation data to construct a realistic scenario-based model of the waiting times, a goal of this approach is to compute shifts of the current schedules that reduce the overall expected waiting time.

17 Claims, 5 Drawing Sheets

```
                                           ╭─50
┌──────────────────────────────────────────────────────────────────┐
│ Algorithm 2 Parallel local search algorithm for the optimization of the schedules │
├──────────────────────────────────────────────────────────────────┤
│ 1: Inputs: Random seed, number of iterations or time limit, original schedule, │
│    scenarios, perturbation proportion n, number of parallel explorations, number │
│    of inner iterations.                                          │
│ 2: Outputs: Best found schedule                                  │
│                                              ▷ Initialization   │
│ 3: Initial best outer schedule is the original schedule          │
│                                              ▷ Main Loop        │
│                                                                  │
│ 4: for the specified number of iterations or until the time limit is reached do │
│ 5:    Run in parallel instances of Algorithm 1 with different seeds │
│ 6:    Retrieve the best inner schedule found in the different instances │
│ 7:    If the new schedule is feasible and the waiting time is reduced then │
│ 8:        Update the outer best schedule                         │
│ 9:    end if                                                     │
│ 10: end for                                                      │
└──────────────────────────────────────────────────────────────────┘
```

(56) References Cited

U.S. PATENT DOCUMENTS

| | | | | |
|---|---|---|---|---|
| 2009/0313095 | A1* | 12/2009 | Hurpin | E04H 6/14 705/13 |
| 2011/0191011 | A1* | 8/2011 | McBride | H04L 41/0823 701/117 |
| 2013/0024249 | A1* | 1/2013 | Zohar | G06Q 10/06 705/13 |
| 2014/0012498 | A1* | 1/2014 | Gustafson | G01C 21/3423 701/468 |
| 2015/0294430 | A1* | 10/2015 | Huang | G06Q 50/26 705/7.24 |
| 2015/0294566 | A1* | 10/2015 | Huang | G05D 1/0261 701/41 |
| 2015/0329129 | A1* | 11/2015 | Sengupta | B61L 27/0016 701/117 |
| 2017/0011629 | A1* | 1/2017 | Lau | G08G 1/127 |
| 2017/0132544 | A1* | 5/2017 | Michel | G06Q 50/30 |
| 2017/0178070 | A1* | 6/2017 | Wang | G06Q 10/0832 |
| 2018/0039949 | A1* | 2/2018 | Cohen-Zur | G06Q 10/1095 |
| 2018/0259976 | A1* | 9/2018 | Williams | G05D 1/0293 |

OTHER PUBLICATIONS

Gallotti, R. et al., Anatomy and efficiency of urban multimodal mobility, Scientific Reports (2014) 4, 9 pages.
Geoffrion, A. M., Generalized Benders Decomposition, Journal of Optimization Theory and Applications (1972) 10 (4):237-260.
Guihaire, V. et al., Transit Network Design and Scheduling: a Global Review, Transportation Research Part A: Policy and Practice Feb. 29, 2008, 31 pages.
Nair, R. et al., Large-Scale Transit Schedule Coordination Based on Journey Planner Requests, Transportation Research Record: Journal of the Transportation Research Board (2013) TRB Annual Meeting, 17 pages.
Poorjafari, V. et al., Synchronisation of Public Transport Services: Comparison of Methods, Proceedings of the Eastern Asia Society for Transportation Studies (2013) 9, 15 pages.

* cited by examiner

FIG. 1

Algorithm 1 Basic local search algorithm for the optimization of the schedules 1: Inputs: Number of iterations or time limit, original schedule, scenarios, perturbation proportion ▷ Initialization 2: The best schedule is the original schedule ▷ Main Loop 3: for the specified number of iterations or until the time is up do
4:    Randomly select a subset of trips to offset
5:    Randomly select a perturbation an offset (within the adequate bounds)
6:    Evaluate the impact of the offset
7:    If the new schedule is feasible and the waiting time is reduced then
8:        Update the best schedule
9:    end if
10: end for

Algorithm 2 Parallel local search algorithm for the optimization of the schedules 1: Inputs: Random seed, number of iterations or time limit, original schedule, scenarios, perturbation proportion n, number of parallel explorations, number of inner iterations.
2: Outputs: Best found schedule ▷ Initialization 3: Initial best outer schedule is the original schedule ▷ Main Loop 4: for the specified number of iterations or until the time limit is reached do
5:    Run in parallel instances of Algorithm 1 with different seeds
6:    Retrieve the best inner schedule found in the different instances
7:    If the new schedule is feasible and the waiting time is reduced then
8:        Update the outer best schedule
9:    end if
10: end for

EFFICIENT OPTIMIZATION OF SCHEDULES IN A PUBLIC TRANSPORTATION SYSTEM

TECHNICAL FIELD

Embodiments are generally related to the field of public transportation planning and the optimization of public transportation schedules. Embodiments also relate to methods and systems for reducing waiting time for passengers using public transportation systems.

BACKGROUND

Public transport planning is a complex process that has a significant impact on the overall quality of the service. One of the key steps in this process is the design of timetables that take into account the transportation resources, law and regulations, and the specific constraints of, for example, a city or region, while satisfying demand and ensuring a smooth experience for passengers. A major weakness of public transit, as perceived by passengers, is the time lost during transfers. This latter can be significant: for example, this represents an average of 23% of travel time for multimodal trips in the United Kingdom. Studies have shown that this transfer waiting time inherent to the system is poorly perceived by passengers.

In the operations research community, much work has been undertaken in the domain of schedule synchronization. The goal of this work is to coordinate the timetables of the different lines in order to minimize the waiting time at the connections. Most of the operations research approaches focus on the theoretical timetables and give the same importance to all the connections at all times of the day. If the real usage of the system is observed, however, it is clear that some connections are more important than others in terms of the frequency and volume of passengers. This is why transportation authorities often incorporate their expert knowledge of the system, as well as experience's rules of thumbs, to design public transportation timetables. However, with the constant growth and sophistication of public transport, these approaches have reached their limit.

A natural alternative is to use the data that is generated by the transportation system to precisely quantify and model transfer waiting times, while accounting for the stochasticity of the system.

Among the first data-driven approaches to schedule optimization, some methods have used queries to an online trip planner to approximate the real usage of the system in order to build a two-stage stochastic linear program (LP). The idea behind this approach is to compute shifts of the schedules that minimize the expected waiting times across a number of scenarios. A recent extension of this approach has proposed to use real transit data taking into account the fact that passengers optimize their transfers according to the schedules. This led to a two-stage stochastic linear program with mixed-integer variables (MILP).

While these approaches may provide finer and more realistic models, they inevitably lead to very large-scale problems. In one approach, only a sub-network was solved using an open-source MILP solver. Tackling an entire city or region with different transportation modes and a substantial number of scenarios is out of the reach of standard optimization solvers.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for improved public transportation planning and optimization of public transportation schedules.

It is another aspect of the disclosed embodiments to provide for methods and systems for reducing waiting time for passengers of public transportation systems.

The aforementioned aspects and other objectives and advantages can now be achieved as described herein. Methods and systems are disclosed herein for optimizing public transportation schedules. In an example embodiment, steps or operations can be performed for evaluating shifts from current schedules associated with a public transportation system, determining an impact on waiting times based on the evaluations of the modifications (or shifts) from the current schedules, and optimizing schedules associated with the public transportation system based on the impact on the waiting times.

In an example embodiment, a new formulation of the stochastic waiting time minimization problem as a quadratic mixed-integer program (MIQP) can be implemented. Although theoretically less appealing than the MILP models, this formulation allows us to exhibit an interesting separability property that we exploit to design the disclosed optimization algorithm. The basic idea is that for a given modification of the schedules, the evaluation of its impact on the waiting times can be done in parallel for the different scenarios. Even within a scenario, it can be shown that the evaluation of certain aggregated transfers is separable and can be accomplished in parallel. Moreover, it can be demonstrated that the optimization subproblem that needs to be solved for the evaluation has a closed-form solution, making the evaluation much more efficient.

These properties can be taken advantage of to design an efficient parallel local search algorithm that explores random modifications of the current schedules looking for ones that reduce the waiting time. Although there are no optimality guarantees, experiments have been implemented, which demonstrate that the disclosed approach can quickly lead to a significant reduction of the expected waiting time.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate one or more embodiments and are not intended to limit the scope thereof.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is, therefore, not intended to be interpreted in a limiting sense.

Throughout the specification and claims, terms may have nuanced meanings suggested or implied in context beyond an explicitly stated meaning. Likewise, phrases such as "in one embodiment" or "in an example embodiment" and variations thereof as utilized herein do not necessarily refer to the same embodiment and the phrase "in another embodiment" or "in another example embodiment" and variations thereof as utilized herein may or may not necessarily refer to a different embodiment. It is intended, for example, that claimed subject matter include combinations of example embodiments in whole or in part.

In general, terminology may be understood, at least in part, from usage in context. For example, terms such as "and," "or," or "and/or" as used herein may include a variety of meanings that may depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context. Additionally, the term "step" can be utilized interchangeably with "instruction" or "operation."

In working with a public transportation system, several assumptions and definitions can be considered in the development and implementation of a schedule optimization approach. For example, a set of nodes N can be considered, wherein a node (among a set of nodes) can be, for example, a stop or an aggregation of stops that allow connections from one to another within a walking distance. A set of routes, R, can also be considered, wherein a route may be a transit service serving a series of stops and can be composed of a collection trips $r=\{p_1, p_2, \ldots, p_n\}$; a set of trips $P:=U_{r \in R} r$; a set of connections C, a connection being a triplet (r,s,i) ∈ Rx Rx such that the node i is visited by both routes r and s. The average walking time to transfer from route r to route s at node i can be denoted by $\Delta_{rsi}$.

In addition to these static characteristics of the system, transfer waiting times can depend on the actual transfers that passengers make. These typically vary from day to day and are unknown at the moment of designing the schedules. Instead, an assumption can be made that one has access to historical transit data, from which observations can be extracted regarding the unknown parameters. The latter can be treated as a random variable ξ. The set of observations can be referred to as scenarios denoted by S. Then for each scenario ξ∈S, the number of passengers transferring from trip p to trip q at node i can be denoted by $T_{pqi}(\xi)$. In addition, $T_{psi}(\xi)$ can denote the number of passengers transferring from trip p to route s at node i($T_{psi}:=\Sigma_{q \in s} T_{pqi}(\xi)$). Also, $t_{pi}(\xi)$ can denote the observed arrival (and departure) time of trip p at node i in the scenario ξ. Because in the data that is used for experiments, there is only one (approximate) value for the arrival and departure time of a vehicle at a stop, the presentation of the disclosed embodiments can be simplified by using the notation $t_{pi}(\xi)$ for both. It is straightforward then to adapt the disclosed model when the two values are available.

Figure 1:
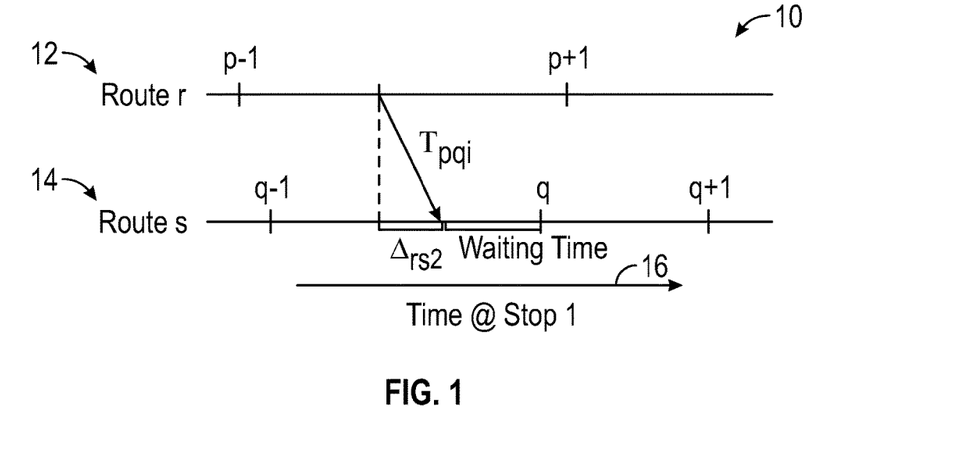
FIG. 1 illustrates a schematic diagram depicting a transfer between two trips of two routes and passengers and waiting times associated with the transfer in a given scenario, in accordance with an example embodiment.

FIG. 1 illustrates a schematic diagram depicting a transfer between two trips of two routes and passengers and waiting times associated with the transfer in a given scenario, in accordance with an example embodiment. That is, FIG. 1 depicts a transfer from a trip p of a route r to a trip q of a route s at a stop in an example scenario. Route r is generally shown in FIG. 1 with respect to line 12 and route s is shown in FIG. 1 with respect to line 14. The time at, for example, Stop 1 is indicated by arrow 16. It can be assumed that the underlying probability distributions of the demand in transfers and arrival times remain valid when the schedules are modified. This assumption seems reasonable when the schedules are shifted by only a few minutes. Another assumption can be made that the capacities of the vehicles are always sufficient to embark all entering passengers, so capacity constraints may not be considered.

A goal of the disclosed embodiments is to find a shift (or offset or modification) of each transit trip such that the expected transfer waiting time is minimized. In achieving this goal, several factors are considered, including decision variables, constraints, an objective function, and a problem formulation.

Decision variables include offsets and transfer choice. Regarding offsets, for every trip p ∈ P, a continuous variable is introduced that represents its offset $x_p$ ∈ R. Note that these variables can define a unique offset per trip, i.e., an offset can be applied to the departure time from the first stop and the travel times are preserved. Regarding transfer choice, for every pair of trips (p,q) ∈ rxs of a connection (r,s,i) ∈ C, a binary variable can be defined to represent whether the passengers seeking to go from route r to s at node i and optimizing their journey would use this transfer as follows: $y_{pqi}(\xi) = \{_0^1\}$, wherein 1 accounts for the case where the passengers would transfer from p to q at node i in scenario $\xi$, and 0 indicates otherwise. Of course, this passenger choice will depend on the schedule offsets. Note that the variable x does not depend on the scenarios because a unique offset is desired that will work for all the scenarios.

Regarding constraints, the minimal set of constraints is described herein. Additional operational constraints that depend on, for example, the city or region, are not described herein. The constraints that are discussed herein include offset bounds, transfer necessity, and transfer feasibility, and are outlined:

Offset bounds. Transportation operators may impose bounds on the time shifts:

$$l_p \le x_p \le u_p. \tag{1}$$

Transfer necessity. For a trip p ∈ r of a connection (r,s,i), such that there are passengers transferring from p to a in a scenario $\xi$ (i.e. $T_{psi}(\xi) > 0$), these passengers would choose at least one transfer from p to a trip of s. This can be formulated as:

$$T_{psi}(\xi)\left(\sum_{q \in s} y_{pqi}(\xi) - 1\right) \ge 0.$$

Transfer Feasibility: A transfer from p ∈ r to q ∈ s of a connection (r,s,i) is feasible if there is enough time between the arrival time of p and the departure time of q at node i for passengers to walk from the stop of p to the stop of q. Let us denote by $w_{pqi}$ this difference for the shifted schedules:

$$w_{pqi}(x,\xi) := (t_{qi}(\xi) + x_q) - (t_{pi}(\xi) + x_p) - \Delta_{rsi} \tag{2}$$

Passengers can only choose feasible transfers hence the constraint: $w_{pqi}(x,\xi) y_{pqi}(\xi) \ge 0$. Note that this constraint and the previous one link the variable y to the offset x.

Regarding the objective function, the goal is to minimize the total expected waiting time. In the disclosed embodiments, since we only have access to a discrete set of observations of the random variable $\xi$, we can approximate the expectation by:

$$\min_x \mathbb{E}_\xi[W(x,\xi)] \approx \sum_{\xi \in S} p_\xi W(x,\xi) \text{ with}$$

$$W(x,\xi) = \sum_{(r,s,i) \in C} \sum_{(p,q) \in r \times s} T_{psi}(\xi) w_{pqi}(x,\xi) y_{pqi}(\xi)$$

where the parameter $p_\xi$ is the probability of scenario $\xi$.

Regarding problem formulation, the problem of minimizing transfer waiting times can be written as shown below in equation (3).

$$W(x,\xi) := \tag{3}$$

$$\begin{cases} \min\limits_{x,y} \sum\limits_{\xi \in S} p_\xi \sum\limits_{(r,s,i) \in C} \sum\limits_{(p,q) \in r \times s} T_{psi}(\xi) w_{pqi}(x,\xi) y_{pqi}(\xi) \\ \quad l_p \le x_p \le u_p & \forall\, p \in \mathcal{P} \\ \quad T_{psi}(\xi)(\Sigma_{q \in s} y_{pqi}(\xi) - 1) \ge 0 & \forall\, p \in r, (r,s,i) \in C, \xi \in \mathcal{S} \\ \text{s.t.} \quad w_{pqi}(x,\xi) y_{pqi}(\xi) \ge 0 & \forall\, (p,q) \in r \times s, \\ & (r,s,i) \in C, \xi \in \mathcal{S} \\ \quad y_{pqi}(\xi) \in \{0,1\} & \forall\, (p,q) \in r \times s, \\ & (r,s,i) \in C, \xi \in \mathcal{S} \end{cases}$$

Note that $w_{pqi}(x,\xi)$ is given by equation (2). This problem is a mixed-integer quadratic program, contrary to prior approaches. Even by relaxing the integrality the constraints, the problem is not convex, because of the form of the objective and the third family of constraints. However, the problem has an interesting property that is helpful in designing efficient heuristics.

The disclosed embodiments further involve a decomposition strategy. In equation or problem (3) shown above, if we fix the offset variable x, the optimization subproblem for y becomes separable with respect to the scenarios and the aggregated trip-to-route transfers. Indeed, when the schedules are fixed, a determination need only be made regarding the optimal choices of transfers for the passengers followed by a deduction regarding the associated waiting time. This can be accomplished independently for each scenario and aggregated transfer. To exploit this property, a two-stage optimization process can be considered, wherein the problem can be rewritten (equivalently) as shown in equations (4) and (5) below:

$$\min_{l \le x \le u} W(x) \text{ with } W(x) = \sum_{\xi \in S} p_\xi \sum_{(r,s,i) \in C} \sum_{p \in r} W^*_{psi}(x,\xi), \tag{4}$$

where $W_{psi}^*(x,\xi)$ is the optimal value of the subproblem:

$$W^*_{psi}(x,\xi) = \begin{cases} \min\limits_y \sum\limits_{q \in s} T_{psi}(\xi) w_{pqi}(x,\xi) y_{pqi}(\xi) \\ \quad T_{psi}(\xi)(\Sigma_{q \in s} y_{pqi}(\xi) - 1) \ge 0 \\ \text{s.t.} \quad w_{pqi}(x,\xi) y_{pqi}(\xi) \ge 0 & \forall\, q \in s \\ \quad y_{pqi}(\xi) \in \{0,1\} & \forall\, q \in s \end{cases} \tag{5}$$

Regarding the subproblem of equation (5), it can be either infeasible or feasible. If the offset variable x is such that $w_{pqi}(x,\xi)<0$ for all $q \in s$, then the subproblem is infeasible. Indeed in this case, the second and third constraints are conflicting: the second imposes that at least one $y_{pqi}(\xi)$ is non-zero whereas the third imposes that all are zeros. If the offset x is such that $w_{pqi}(x,\xi) \geq 0$ for at least one $q \in s$, then for all q such that $w_{pqi}(x,\xi)<0$, the second constraint in equation (5) imposes that $y_{pqi}(\xi)=0$, and given the form of the objective function, it is optimal to have $y_{pqi}(\xi)=1$ for a q such that $w_{pqi}(x,\xi)$ is positive and minimal. Therefore, the following closed-form solution is optimal:

$$y^*_{pqi} = \begin{cases} 1 & \text{if } q = \mathrm{argmin}_{q \in s}\{w_{pqi}(x) : w_{pqi}(x) \geq 0\}, \\ 0 & \text{otherwise.} \end{cases}$$

Note that if the argmin is not a singleton, one can simply take any index of the set. Therefore, for a fixed offset, we can compute in parallel the solutions of the subproblems for different scenarios and potentially for batches of aggregated transfers. This ensures that it will take a near-constant time regardless of the number of transfers to be optimized and the number of scenarios to be considered.

Given that it is relatively easy to solve the subproblems for fixed schedules, we will now describe how one can fix the schedules' offsets. Several options are possible here. For example, a generalized Benders decomposition may be well-suited for this situation. However, because the function W in equation (4) is not convex, there are no optimality guarantees. A simpler heuristic can be obtained using local search techniques. The idea is to discretize the interval $[l_p, u_p]$ (by minute for example) and explore the discrete set of possible offsets, seeking schedules that reduce the waiting time. A key factor to the success of a local search heuristic is the efficiency of the evaluation of a perturbed solution (in this case shifted schedule). Since here the evaluation of an offset boils down to computing a series of minimums, potentially in a distributed fashion, it is indeed very efficient.

Figure 2:
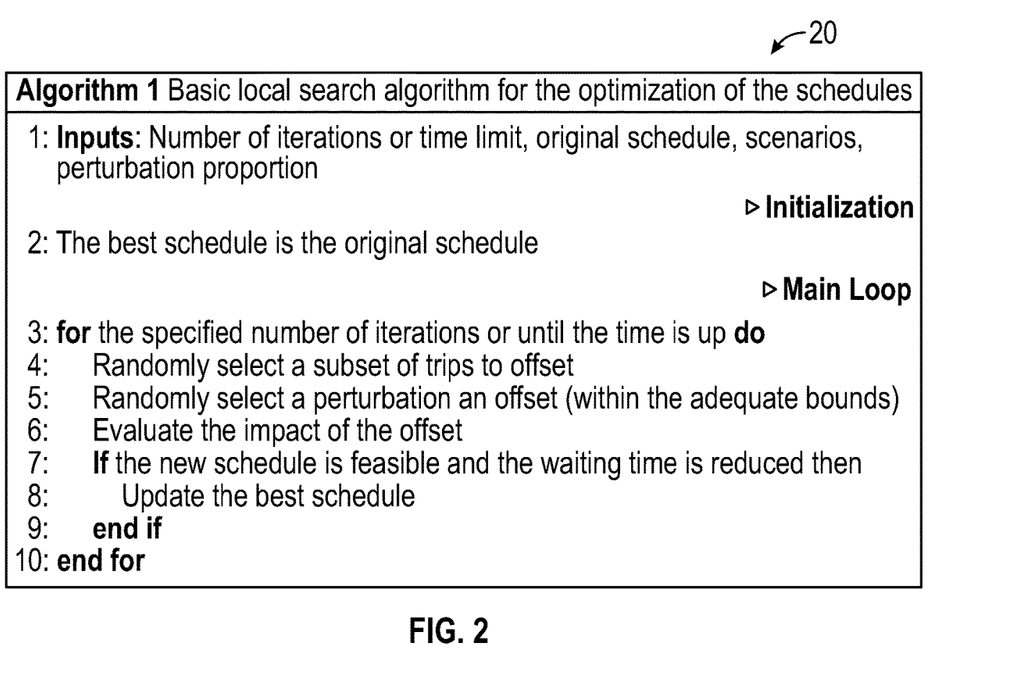
FIG. 2 illustrates a diagram illustrating a basic local search algorithm for the optimization of schedules, which can be implemented in accordance with an example embodiment.

FIG. 2 illustrates a diagram illustrating a basic local search method 20 (Algorithm 1) for the optimization of schedules, in accordance with an example embodiment. The method 20 shown in FIG. 2 can be refined with a few features as follows. The method 20 can be implemented in the context of a search algorithm. Greedy iterations can be considered in the context of the method 20 shown in FIG. 2. That is, greedy iterations can be added periodically in the algorithm, wherein all transfers are considered for which the transfer waiting time is not 0 (starting with the ones with the largest waiting time or in a random order) and the optimal offset of the involved trips for this transfer is computed. Of course, this optimal offset may increase the waiting time at other transfers or even make them infeasible. This is why the greedy iterations are not always successful. However, it has been observed that especially at the beginning of the algorithm, greedy iterations help to quickly decrease the waiting time.

Another factor to be considered involves smart bounds. That is, to avoid exploring offsets that would lead to infeasible schedules, the original bounds (1) can be refined to take into account the current offset and the schedules of the previous and next trips. Finally, parallel inner iterations are considered. That is, starting from a given schedule, a number of different local search iterations can be explored in parallel, followed by retrieval of the best solution, and the process begins again.

Figure 3:
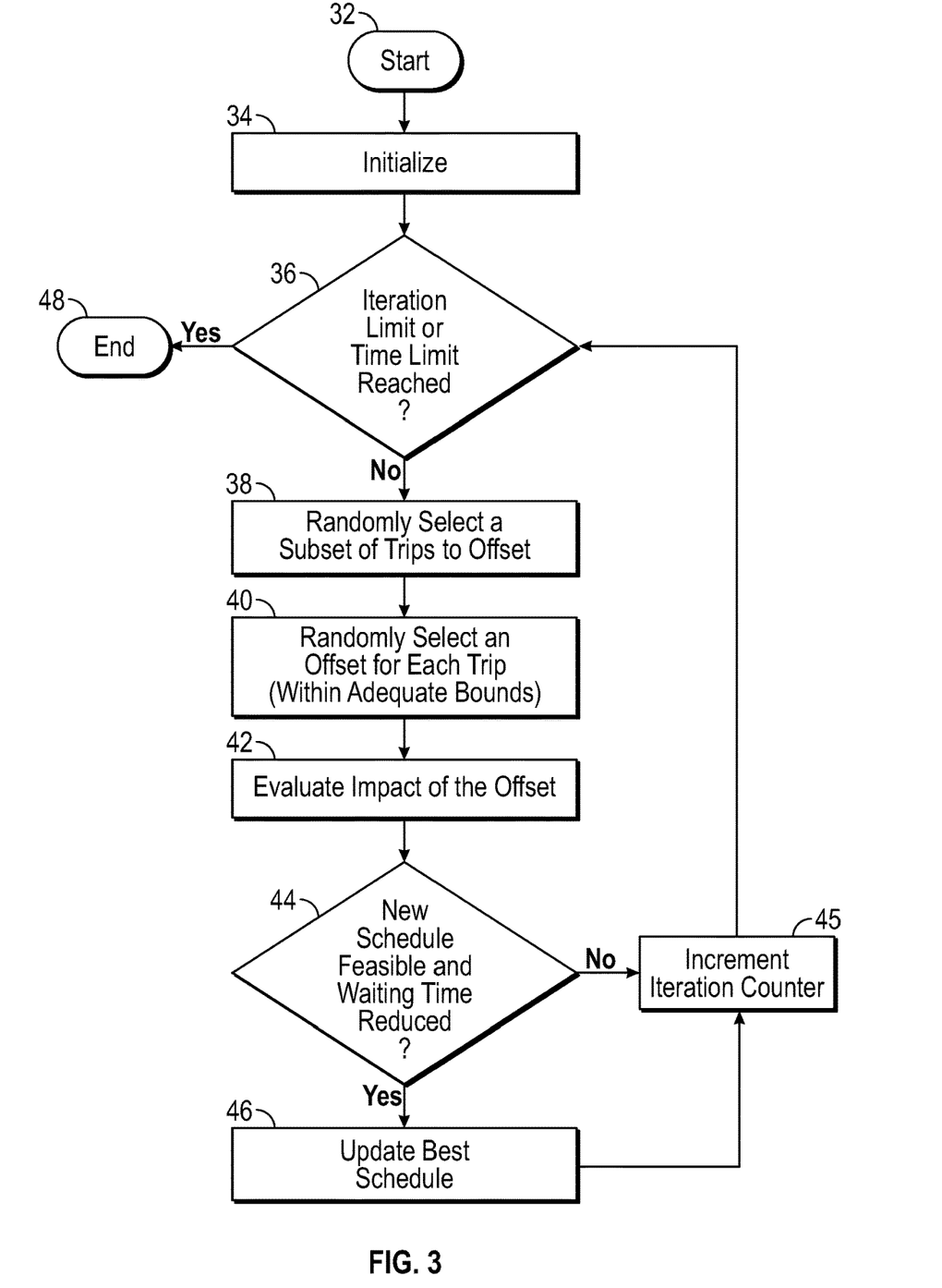
FIG. 3 illustrates a high level flow chart depicting logical operational steps of a method for implementing a search algorithm for the optimization of schedules, in accordance with an example embodiment.

FIG. 3 illustrates a flow chart of operations depicting logical operational steps of a method for implementing a basic local search for the optimization of schedules, in accordance with an example embodiment. The method illustrated in FIG. 3 generally tracks the method 20 or Algorithm 1 shown in FIG. 2. The method shown in FIG. 3 includes a number of rules as outlined in the various blocks depicted in FIG. 3. The operations depicted in FIG. 3 can begin as shown at block 32. Then, the process initializes, as indicated at block 34, in which inputs are provided. Such inputs can include, but are not limited to, the number of iterations or a time limit, the original schedule, scenarios, and perturbation proportion. Note that as a part of the method depicted in FIG. 3, the best schedule is considered to be the original schedule.

Thereafter, as shown at decision block 36, a test can be performed to determine if an iteration limit or time limit has been reached. If the answer is "yes," then the process ends, as shown at block 48. Otherwise, as indicated at block 38, an operation can be implemented to randomly select a subset of trips to offset. Thereafter, as shown at block 40, an operation can be implemented to randomly select an offset for each trip (within adequate bounds). Next, as indicated at block 42, an operation can be implemented to evaluate the impact of the offset. Thereafter, as shown at decision block 44, a test can be performed to determine if the new schedule is feasible and if the waiting time is reduced. If not, then an operation can be implemented, as shown at block 45, to increment the iteration counter. If "yes," then an operation is performed, as shown at block 46, to update the best schedule, followed by the processing of the operation shown at block 45. Following processing of the operation depicted at block 45, the process returns or loops back to implement the operation depicted at decision block 36 and so on.

Figure 4:
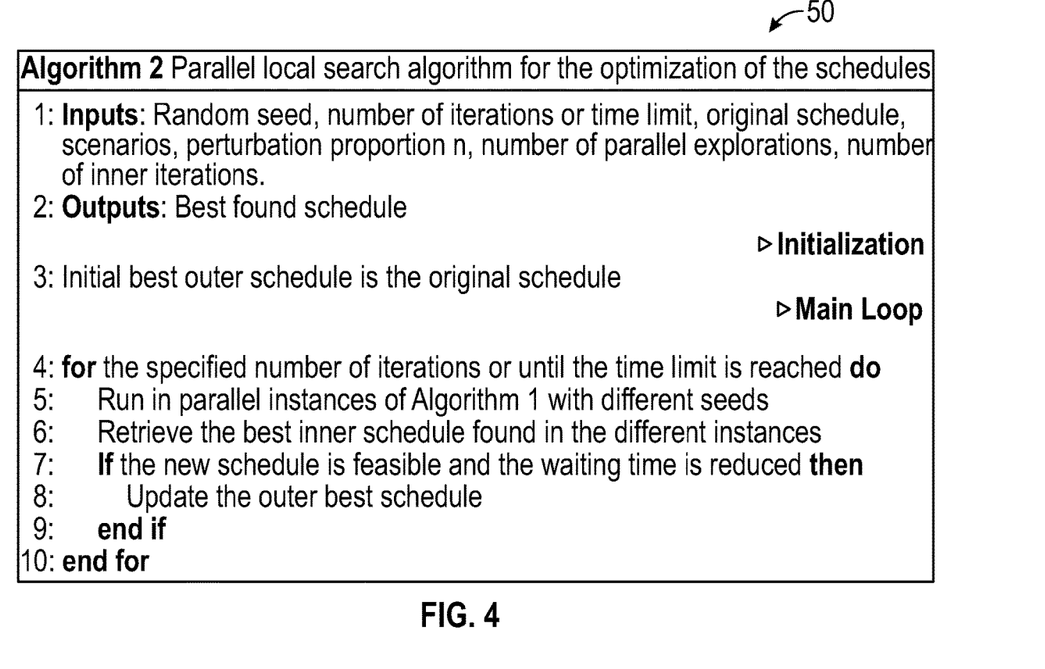
FIG. 4 illustrates a diagram illustrating a parallel local search method for the optimization of schedules, which can be implemented in accordance with another example embodiment.

FIG. 4 illustrates a diagram illustrating a parallel local search method 50 (Algorithm 2) for the optimization of schedules, which can be implemented in accordance with another example embodiment. To exploit even more our parallel resources, two levels of iterations can be performed. That is, we can embed Algorithm 1 shown in FIG. 2 in parallel outer iterations. The concept here is that starting from a given schedule, we can perform a number of different local search iterations in parallel, then we retrieve the best solution, and start again. Algorithm 2 (i.e., method 50) shown in FIG. 4 presents the main step of the resulting procedure.

Figure 5:
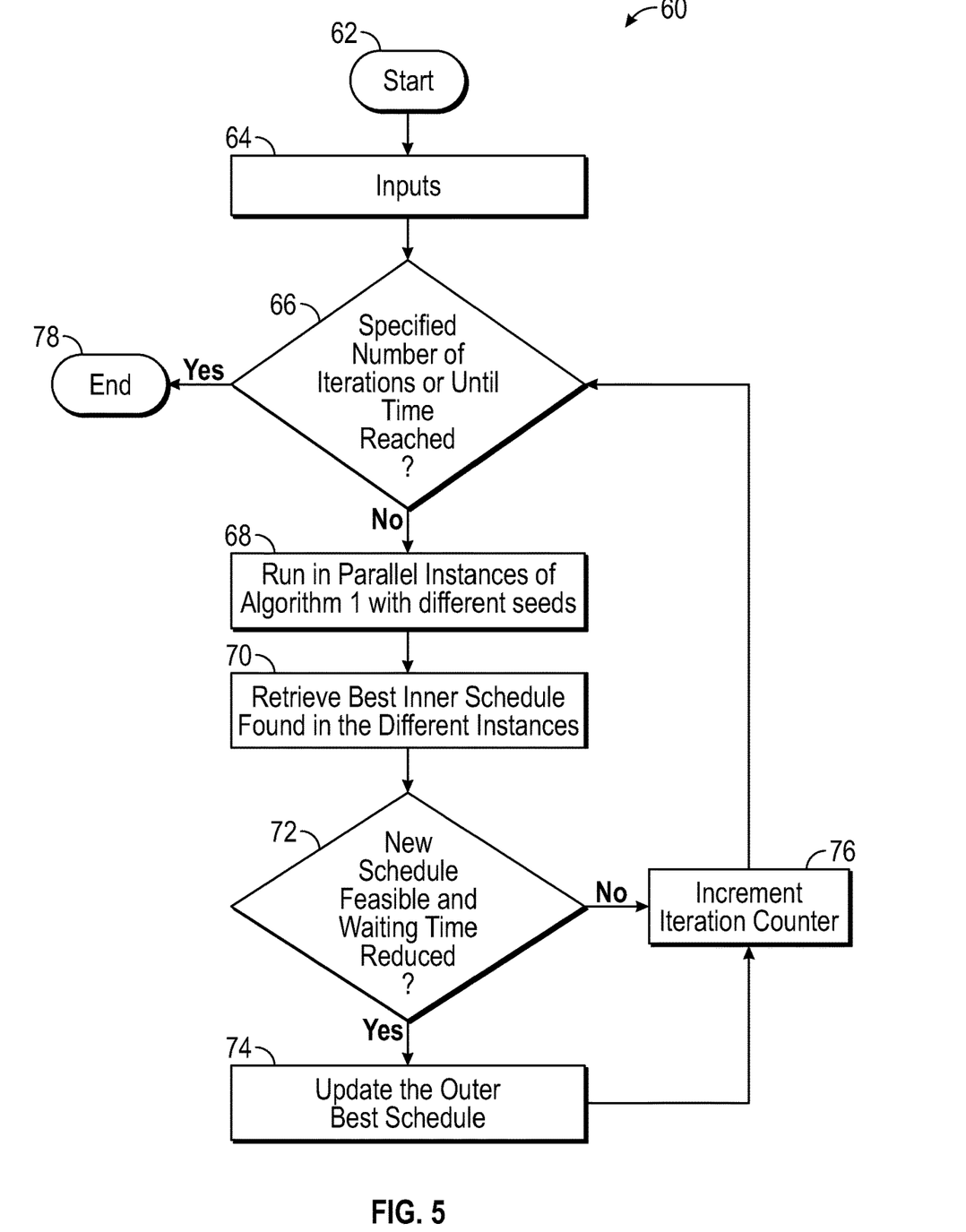
FIG. 5 illustrates a flow chart of operations depicting logical operational steps of a method for implementing a basic local search for the optimization of schedules, in accordance with an example embodiment.

FIG. 5 illustrates a flow chart of operations depicting logical operational steps of a method 60 for implementing a basic local search for the optimization of schedules, in accordance with yet another example embodiment. The method 60 shown in FIG. 5 tracks the method 50 or Algorithm 2 depicted in FIG. 4. As shown at block 62 in FIG. 5, the process begins. Thereafter, as indicated at block 64, inputs can be set or initialized. Such inputs can include, for example, a random seed, the number of iterations or time limit, the original schedule, scenarios, a perturbation proportion value, the number of parallel explorations, the number of inner iterations, etc.

Thereafter, as depicted at decision block 66, a test can be performed to determine if the number of iterations has been reached or the time has been reached. In other words, have the specified number of iterations or time been achieved? If the answer is "yes," then the process ends, as shown at block 78. If not, as shown at block 68, a step or operation can be implemented to run in parallel instances of Algorithm 1 (e.g., see FIG. 2) with different seeds. Then, as shown next at block 70, a step or operation can be implemented to retrieve the best inner schedule found in the different instances. Then, as indicated at decision block 72, a test can be performed to determine if the new schedule is feasible and if waiting times have been reduced. If so, then an operation can be implemented, as shown at block 74, to update the outer best schedule. If the answer is "no" with respect to decision block 72, the iteration counter is incremented, followed by processing of the operation shown at decision block 66 and so on.

Preliminary results have been obtained from some experimental embodiments. For example, preliminary results of applying the disclosed decomposition approach to a real trans system and comparing these results to the state of art are discussed below. To obtain these results, transit data from the city of Nancy, France was extracted from an e-card validation collection. As a first step, we only consider the two main lines (a tramway and a bus), which are the most regular and loaded. To generate the scenarios, we assume that for similar weekdays, the distribution of $\xi$ is i.i.d. Hence, we select 3 "standard" days and take them as equi-probable. For the sake of comparison, we test problems composed of 2 and 3 scenarios (days). Because there are some inherent errors in the recording of the data and in the reconstruction of the trips, we performed some data cleaning and filtering to make the data coherent. For example, we filtered the observed transfers to keep only the ones for which the difference between departure and arrival time is larger than the walking time between the stops. Moreover, for each route, we only kept the trips that are common to the three days. An alternative experimental embodiment would be to consider the number of trips of a route per day as stochastic and add that as an additional random parameter. We ended up with a few hundred transfers per day to optimize.

We compare our results to the approach disclosed in S. Michel and B. Chidlovskii, *Stochastic optimization of public transport schedules to reduce transfer waiting times;* 2016 *IEEE International Smart Cities, Conference (ISC2)*, pages 1-6, 2016. In this latter, the "trip window" parameter limits the options for passengers to optimize their transfers according to the schedule shifts, by replacing the set sin (3) by a subset of it of cardinality "trip window." The larger this parameter, the more realistic the model but also the larger the optimization problem (in terms of number of variables and constraints). In our experiments, we fixed this parameter to 15 (i.e., passengers optimize their transfers within 15 trips of their original transfer). For both approaches, we choose a time limit of one hour. Although we may spend more computing time on this problem in a real-life setting, we believe that one hour is a good limit here since we only consider a small sub-network and few scenarios.

Table 1 thus presents data comparing the reduction in the expected waiting time for 2 scenarios (in %) between the MILP approach and our local search approach Table 2 presents data comparing the reduction in the expected waiting time for 3 scenarios (in %) between the MILP approach and our local search approach.

We see with respect to Tables 1 and 2 above that the local search heuristic leads to a large reduction of the expected waiting times in all cases (at least 62% and up to 90%). We observe that the reduction is generally larger when the offset bound is larger, which is expected since the model offers more flexibility. We also notice that for the same offset bound, the reduction is smaller for three than for two scenarios, which is also intuitive: the more scenarios, the more various transfers to optimize and the more chances of getting "conflicting" ones.

When we compare the LS solution to the MILP one, we see that we lose in the worst case 10% of reduction in the waiting time. Moreover, this loss in smaller for three (average around 3%) than for two scenarios (average around 9%) (Table 1 versus 2). We even get 27% more reduction in one 3-scenarios instance. These observations are encouraging because our ultimate goal is to handle much more scenarios in order to have a stochastic model that is as general and realistic as possible.

As can be appreciated by one skilled in the art, embodiments can be implemented in the context of a method, data processing system, or computer program product. Accordingly, embodiments may take the form of an entire hardware embodiment, an entire software embodiment, or an embodiment combining software and hardware aspects all generally referred to herein as a "circuit" or "module." Furthermore, embodiments may in some cases take the form of a computer program product on a computer-usable storage medium having computer-usable program code embodied in the medium. Any suitable computer readable medium may be utilized including hard disks, USB Flash Drives, DVDs, CD-ROMs, optical storage devices, magnetic storage devices, server storage, databases, etc.

TABLE 1

| Offset bound | 2 min | 3 min | 4 min | 5 min | 6 min | 7 min | 8 min | 9 min | 10 min | Avg |
|---|---|---|---|---|---|---|---|---|---|---|
| MILP | 80 | 89 | 95 | 96 | 95 | 98 | 99 | 99 | 99 | 94.44 |
| LS | 70 | 80 | 85 | 87 | 89 | 87 | 90 | 90 | 89 | 85.22 |
| Difference | 10 | 9 | 10 | 9 | 6 | 11 | 9 | 9 | 10 | 9.22 |

TABLE 2

| Offset bound | 2 min | 3 min | 4 min | 5 min | 6 min | 7 min | 8 min | 9 min | 10 min | Avg |
|---|---|---|---|---|---|---|---|---|---|---|
| MILP | 72 | 79 | 87 | 86 | 86 | 90 | 83 | 87 | 56 | 80.66 |
| LS | 62 | 69 | 76 | 80 | 78 | 84 | 83 | 81 | 83 | 77.33 |
| Difference | 10 | 10 | 11 | 6 | 8 | 6 | 0 | 6 | −27 | 3.33 |

Table 1 above presents the results for the stochastic optimization over 2 scenarios and Table 2 above over 3 scenarios. For different values of the offset bounds (see constraint (1)), we report the reduction in percentage of the expected waiting time for the optimized schedules compared to the initial ones. We take the solution provided by the MILP as a reference, although the solver (Coin-OR CBC) did not converge within the time limit of one hour in all but one case. In the case of non-convergence, we simply retrieve the best value found by the solver.

Computer program code for carrying out operations of the present invention may be written in an object oriented programming language (e.g., Java, C++, etc.). The computer program code, however, for carrying out operations of particular embodiments may also be written in conventional procedural programming languages, such as the "C" programming language or in a visually oriented programming environment, such as, for example, Visual Basic.

The program code may execute entirely on the user's computer, partly on the user's computer, as a stand-alone software package, partly on the user's computer and partly on a remote computer, or entirely on the remote computer. In the latter scenario, the remote computer may be connected to a user's computer through a local area network (LAN) or a wide area network (WAN), wireless data network e.g., Wi-Fi, Wimax, 802.xx, and cellular network, or the connection may be made to an external computer via most third party supported networks (for example, through the Internet utilizing an Internet Service Provider).

The embodiments are described at least in part herein with reference to flowchart illustrations and/or block diagrams of methods, systems, and computer program products and data structures according to embodiments of the invention. It will be understood that each block of the illustrations, and combinations of blocks, can be implemented by computer program instructions. These computer program instructions may be provided to a processor of, for example, a general-purpose computer, special-purpose computer, or other programmable data processing apparatus to produce a machine, such that the instructions, which execute via the processor of the computer or other programmable data processing apparatus, create means for implementing the functions/acts specified in the block or blocks. To be clear, the disclosed embodiments can be implemented in the context of, for example, a special-purpose computer or a general-purpose computer, or other programmable data processing apparatus or system. For example, in some embodiments, a data processing apparatus or system can be implemented as a combination of a special-purpose computer and a general-purpose computer.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the various block or blocks, flowcharts, and other architecture illustrated and described herein.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 6:
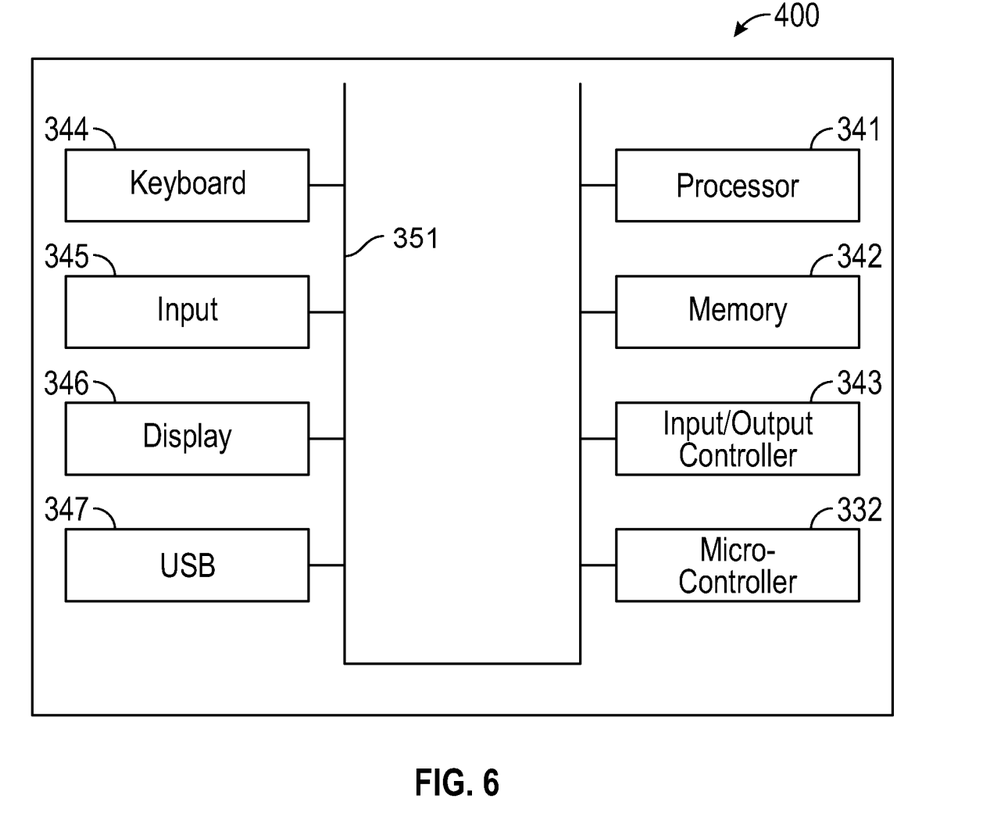
FIG. 6 illustrates a schematic view of a computer system, in accordance with an embodiment.
Figure 7:
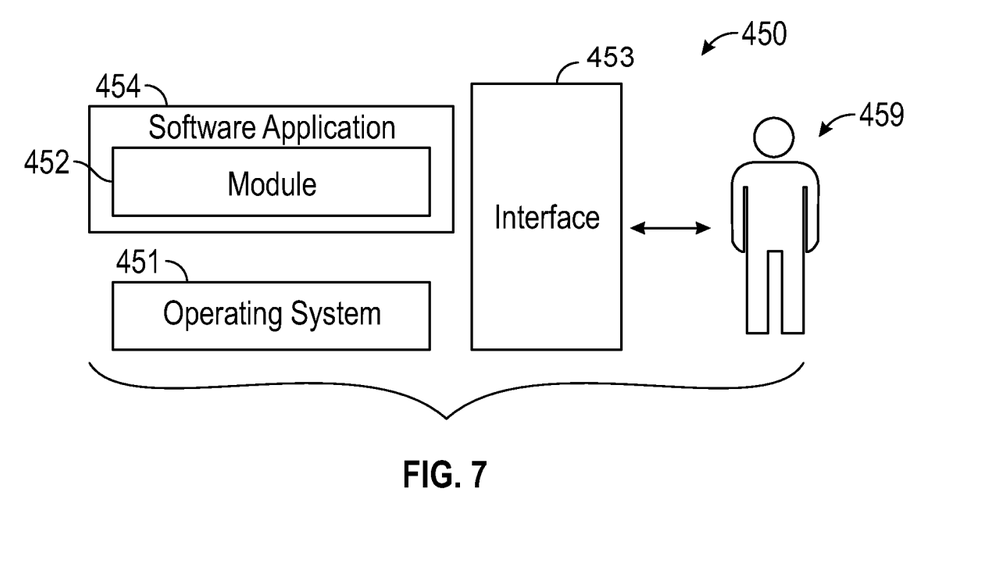
FIG. 7 illustrates a schematic view of a software system including a module, an operating system, and a user interface, in accordance with an embodiment.

FIGS. 6-7 are shown only as exemplary diagrams of data-processing environments in which example embodiments may be implemented. It should be appreciated that FIGS. 6-7 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

As illustrated in FIG. 6, some embodiments may be implemented in the context of a data-processing system 400 that can include, for example, one or more processors such as a processor 341 (e.g., a CPU (Central Processing Unit) and/or other microprocessors), a memory 342, an input/output controller 343, a microcontroller 332, a peripheral USB (Universal Serial Bus) connection 347, a keyboard 344 and/or another input device 345 (e.g., a pointing device, such as a mouse, track ball, pen device, etc.), a display 346 (e.g., a monitor, touch screen display, etc.) and/or other peripheral connections and components.

As illustrated, the various components of data-processing system 400 can communicate electronically through a system bus 351 or similar architecture. The system bus 351 may be, for example, a subsystem that transfers data between, for example, computer components within data-processing system 400 or to and from other data-processing devices, components, computers, etc. The data-processing system 400 may be implemented in some embodiments as, for example, a server in a client-server based network (e.g., the Internet) or in the context of a client and a server (i.e., where aspects are practiced on the client and the server).

In some example embodiments, data-processing system 400 may be, for example, a standalone desktop computer, a laptop computer, a Smartphone, a pad computing device and so on, wherein each such device is operably connected to and/or in communication with a client-server based network or other types of networks (e.g., cellular networks, Wi-Fi, etc.).

FIG. 7 illustrates a computer software system 450 for directing the operation of the data-processing system 400 depicted in FIG. 6. Software application 454, stored for example in memory 342, generally includes a kernel or operating system 451 and a shell or interface 453. One or more application programs, such as software application 454, may be "loaded" (i.e., transferred from, for example, mass storage or another memory location into the memory 342) for execution by the data-processing system 400. The data-processing system 400 can receive user commands and data through the interface 453; these inputs may then be acted upon by the data-processing system 400 in accordance with instructions from operating system 451 and/or software application 454. The interface 453 in some embodiments can serve to display results, whereupon a user 459 may supply additional inputs or terminate a session. The software application 454 can include module(s) 452, which can, for example, implement instructions or operations such as those discussed herein with respect FIGS. 2-3.

The following discussion is intended to provide a brief, general description of suitable computing environments in which the system and method may be implemented. Although not required, the disclosed embodiments will be described in the general context of computer-executable instructions, such as program modules being executed by a single computer. In most instances, a "module" can constitute a software application, but can also be implemented as both software and hardware (i.e., a combination of software and hardware).

Generally, program modules include, but are not limited to, routines, subroutines, software applications, programs, objects, components, data structures, etc., that perform particular tasks or implement particular data types and instructions. Moreover, those skilled in the art will appreciate that the disclosed method and system may be practiced with other computer system configurations, such as, for example, hand-held devices, multi-processor systems, data networks, microprocessor-based or programmable consumer electronics, networked PCs, minicomputers, mainframe computers, servers, and the like.

Note that the term module as utilized herein may refer to a collection of routines and data structures that perform a particular task or implements a particular data type. Modules may be composed of two parts: an interface, which lists the constants, data types, variable, and routines that can be accessed by other modules or routines, and an implementation, which is typically private (accessible only to that module) and which includes source code that actually implements the routines in the module. The term module may also simply refer to an application, such as a computer program designed to assist in the performance of a specific task, such as word processing, accounting, inventory management, etc.

FIGS. 6-7 are thus intended as examples and not as architectural limitations of disclosed embodiments. Additionally, such embodiments are not limited to any particular application or computing or data processing environment. Instead, those skilled in the art will appreciate that the disclosed approach may be advantageously applied to a variety of systems and application software. Moreover, the disclosed embodiments can be embodied on a variety of different computing platforms, including Macintosh, UNIX, LINUX, and the like.

The claims, description, and drawings of this application may describe one or more of the instant technologies in operational/functional language, for example, as a set of operations to be performed by a computer. Such operational/functional description in most instances can be specifically-configured hardware (e.g., because a general purpose computer in effect becomes a special-purpose computer once it is programmed to perform particular functions pursuant to instructions from program software). Note that the data-processing system 400 discussed herein may be implemented as special-purpose computer in some example embodiments. In some example embodiments, the data-processing system 400 can be programmed to perform the aforementioned particular instructions thereby becoming in effect a special-purpose computer.

Importantly, although the operational/functional descriptions described herein are understandable by the human mind, they are not abstract ideas of the operations/functions divorced from computational implementation of those operations/functions. Rather, the operations/functions represent a specification for the massively complex computational machines or other means. As discussed in detail below, the operational/functional language must be read in its proper technological context, i.e., as concrete specifications for physical implementations.

The logical operations/functions described herein can be a distillation of machine specifications or other physical mechanisms specified by the operations/functions such that the otherwise inscrutable machine specifications may be comprehensible to the human mind. The distillation also allows one skilled in the art to adapt the operational/functional description of the technology across many different specific vendors' hardware configurations or platforms, without being limited to specific vendors' hardware configurations or platforms.

Some of the present technical description (e.g., detailed description, drawings, claims, etc.) may be set forth in terms of logical operations/functions. As described in more detail in the following paragraphs, these logical operations/functions are not representations of abstract ideas, but rather representative of static or sequenced specifications of various hardware elements. Differently stated, unless context dictates otherwise, the logical operations/functions are representative of static or sequenced specifications of various hardware elements. This is true because tools available to implement technical disclosures set forth in operational/functional formats—tools in the form of a high-level programming language (e.g., C, Java, Visual Basic, etc.), or tools in the form of Very high speed Hardware Description Language ("VHDL," which is a language that uses text to describe logic circuits)—are generators of static or sequenced specifications of various hardware configurations. This fact is sometimes obscured by the broad term "software," but, as shown by the following explanation, what is termed "software" is a shorthand for a massively complex interchaining/specification of ordered-matter elements. The term "ordered-matter elements" may refer to physical components of computation, such as assemblies of electronic logic gates, molecular computing logic constituents, quantum computing mechanisms, etc.

For example, a high-level programming language is a programming language with strong abstraction, e.g., multiple levels of abstraction, from the details of the sequential organizations, states, inputs, outputs, etc., of the machines that a high-level programming language actually specifies. In order to facilitate human comprehension, in many instances, high-level programming languages resemble or even share symbols with natural languages.

It has been argued that because high-level programming languages use strong abstraction (e.g., that they may resemble or share symbols with natural languages), they are therefore a "purely mental construct" (e.g., that "software"—a computer program or computer programming—is somehow an ineffable mental construct, because at a high level of abstraction, it can be conceived and understood in the human mind). This argument has been used to characterize technical description in the form of functions/operations as somehow "abstract ideas." In fact, in technological arts (e.g., the information and communication technologies) this is not true.

The fact that high-level programming languages use strong abstraction to facilitate human understanding should not be taken as an indication that what is expressed is an abstract idea. In an example embodiment, if a high-level programming language is the tool used to implement a technical disclosure in the form of functions/operations, it can be understood that, far from being abstract, imprecise, "fuzzy," or "mental" in any significant semantic sense, such a tool is instead a near incomprehensibly precise sequential specification of specific computational-machines—the parts of which are built up by activating/selecting such parts from typically more general computational machines over time (e.g., clocked time). This fact is sometimes obscured by the superficial similarities between high-level programming languages and natural languages. These superficial similarities also may cause a glossing over of the fact that high-level programming language implementations ultimately perform valuable work by creating/controlling many different computational machines.

The many different computational machines that a high-level programming language specifies are almost unimaginably complex. At base, the hardware used in the computational machines typically consists of some type of ordered matter (e.g., traditional electronic devices (e.g., transistors), deoxyribonucleic acid (DNA), quantum devices, mechanical switches, optics, fluidics, pneumatics, optical devices (e.g., optical interference devices), molecules, etc.) that are arranged to form logic gates. Logic gates are typically physical devices that may be electrically, mechanically, chemically, or otherwise driven to change physical state in order to create a physical reality of Boolean logic.

Logic gates may be arranged to form logic circuits, which are typically physical devices that may be electrically, mechanically, chemically, or otherwise driven to create a physical reality of certain logical functions. Types of logic circuits include such devices as multiplexers, registers, arithmetic logic units (ALUs), computer memory devices, etc., each type of which may be combined to form yet other types of physical devices, such as a central processing unit (CPU)—the best known of which is the microprocessor. A modern microprocessor will often contain more than one hundred million logic gates in its many logic circuits (and often more than a billion transistors).

The logic circuits forming the microprocessor are arranged to provide a micro architecture that will carry out the instructions defined by that microprocessors defined Instruction Set Architecture. The Instruction Set Architecture is the part of the microprocessor architecture related to programming, including the native data types, instructions, registers, addressing modes, memory architecture, interrupt and exception handling, and external Input/Output.

The Instruction Set Architecture includes a specification of the machine language that can be used by programmers to use/control the microprocessor. Since the machine language instructions are such that they may be executed directly by the microprocessor, typically they consist of strings of binary digits, or bits. For example, a typical machine language instruction might be many bits long (e.g., 32, 64, or 128 bit strings are currently common). A typical machine language instruction might take the form "11110000101011110000111100111111" (a 32 bit instruction).

It is significant here that, although the machine language instructions are written as sequences of binary digits, in actuality those binary digits specify physical reality. For example, if certain semiconductors are used to make the operations of Boolean logic a physical reality, the apparently mathematical bits "1" and "0" in a machine language instruction actually constitute a shorthand that specifies the application of specific voltages to specific wires. For example, in some semiconductor technologies, the binary number "1" (e.g., logical "1") in a machine language instruction specifies around +5 volts applied to a specific "wire" (e.g., metallic traces on a printed circuit board) and the binary number "0" (e.g., logical "0") in a machine language instruction specifies around −5 volts applied to a specific "wire." In addition to specifying voltages of the machines' configuration, such machine language instructions also select out and activate specific groupings of logic gates from the millions of logic gates of the more general machine. Thus, far from abstract mathematical expressions, machine language instruction programs, even though written as a string of zeros and ones, specify many, many constructed physical machines or physical machine states.

Machine language is typically incomprehensible by most humans (e.g., the above example was just ONE instruction, and some personal computers execute more than two billion instructions every second).

Thus, programs written in machine language-which may be tens of millions of machine language instructions long—are incomprehensible. In view of this, early assembly languages were developed that used mnemonic codes to refer to machine language instructions, rather than using the machine language instructions' numeric values directly (e.g., for performing a multiplication operation, programmers coded the abbreviation "mult," which represents the binary number "011000" in MIPS machine code). While assembly languages were initially a great aid to humans controlling the microprocessors to perform work, in time the complexity of the work that needed to be done by the humans outstripped the ability of humans to control the microprocessors using merely assembly languages.

At this point, it was noted that the same tasks needed to be done over and over, and the machine language necessary to do those repetitive tasks was the same. In view of this, compilers were created. A compiler is a device that takes a statement that is more comprehensible to a human than either machine or assembly language, such as "add 2+2 and output the result," and translates that human understandable statement into a complicated, tedious, and immense machine language code (e.g., millions of 32, 64, or 128 bit length strings). Compilers thus translate high-level programming language into machine language.

This compiled machine language, as described above, is then used as the technical specification which sequentially constructs and causes the interoperation of many different computational machines such that humanly useful, tangible, and concrete work is done. For example, as indicated above, such machine language—the compiled version of the higher-level language—functions as a technical specification, which selects out hardware logic gates, specifies voltage levels, voltage transition timings, etc., such that the humanly useful work is accomplished by the hardware.

Thus, a functional/operational technical description, when viewed by one skilled in the art, is far from an abstract idea. Rather, such a functional/operational technical description, when understood through the tools available in the art such as those just described, is instead understood to be a humanly understandable representation of a hardware specification, the complexity and specificity of which far exceeds the comprehension of most any one human. Accordingly, any such operational/functional technical descriptions may be understood as operations made into physical reality by (a) one or more interchained physical machines, (b) interchained logic gates configured to create one or more physical machine(s) representative of sequential/combinatorial logic(s), (c) interchained ordered matter making up logic gates (e.g., interchained electronic devices (e.g., transistors), DNA, quantum devices, mechanical switches, optics, fluidics, pneumatics, molecules, etc.) that create physical reality representative of logic(s), or (d) virtually any combination of the foregoing. Indeed, any physical object, which has a stable, measurable, and changeable state may be used to construct a machine based on the above technical description. Charles Babbage, for example, constructed the first computer out of wood and powered by cranking a handle.

Thus, far from being understood as an abstract idea, it can be recognized that a functional/operational technical description as a humanly-understandable representation of one or more almost unimaginably complex and time sequenced hardware instantiations. The fact that functional/ operational technical descriptions might lend themselves readily to high-level computing languages (or high-level block diagrams for that matter) that share some words, structures, phrases, etc., with natural language simply cannot be taken as an indication that such functional/operational technical descriptions are abstract ideas, or mere expressions of abstract ideas. In fact, as outlined herein, in the technological arts this is simply not true. When viewed through the tools available to those skilled in the art, such functional/operational technical descriptions are seen as specifying hardware configurations of almost unimaginable complexity.

As outlined above, the reason for the use of functional/operational technical descriptions is at least twofold. First, the use of functional/operational technical descriptions allows near-infinitely complex machines and machine operations arising from interchained hardware elements to be described in a manner that the human mind can process (e.g., by mimicking natural language and logical narrative flow). Second, the use of functional/operational technical descriptions assists the person skilled in the art in understanding the described subject matter by providing a description that is more or less independent of any specific vendor's piece(s) of hardware.

The use of functional/operational technical descriptions assists the person skilled in the art in understanding the described subject matter since, as is evident from the above discussion, one could easily, although not quickly, transcribe the technical descriptions set forth in this document as trillions of ones and zeroes, billions of single lines of assembly-level machine code, millions of logic gates, thousands of gate arrays, or any number of intermediate levels of abstractions. However, if any such low-level technical descriptions were to replace the present technical description, a person skilled in the art could encounter undue difficulty in implementing the disclosure, because such a low-level technical description would likely add complexity without a corresponding benefit (e.g., by describing the subject matter utilizing the conventions of one or more vendor-specific pieces of hardware). Thus, the use of functional/operational technical descriptions assists those skilled in the art by separating the technical descriptions from the conventions of any vendor-specific piece of hardware.

In view of the foregoing, the logical operations/functions set forth in the present technical description are representative of static or sequenced specifications of various ordered-matter elements, in order that such specifications may be comprehensible to the human mind and adaptable to create many various hardware configurations. The logical operations/functions disclosed herein should be treated as such, and should not be disparagingly characterized as abstract ideas merely because the specifications they represent are presented in a manner that one skilled in the art can readily understand and apply in a manner independent of a specific vendor's hardware implementation.

At least a portion of the devices or processes described herein can be integrated into an information processing system. An information processing system generally includes one or more of a system unit housing, a video display device, memory, such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), or control systems including feedback loops and control motors (e.g., feedback for detecting position or velocity, control motors for moving or adjusting components or quantities). An information processing system can be implemented utilizing suitable commercially available components, such as those typically found in data computing/communication or network computing/communication systems.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes or systems or other technologies described herein can be effected (e.g., hardware, software, firmware, etc., in one or more machines or articles of manufacture), and that the preferred vehicle will vary with the context in which the processes, systems, other technologies, etc., are deployed. For example, if an implementer determines that speed and accuracy are paramount, the implementer may opt for a mainly hardware or firmware vehicle; alternatively, if flexibility is paramount, the implementer may opt for a mainly software implementation that is implemented in one or more machines or articles of manufacture; or, yet again alternatively, the implementer may opt for some combination of hardware, software, firmware, etc., in one or more machines or articles of manufacture. Hence, there are several possible vehicles by which the processes, devices, other technologies, etc., described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. In an embodiment, optical aspects of implementations will typically employ optically-oriented hardware, software, firmware, etc., in one or more machines or articles of manufacture.

The herein described subject matter sometimes illustrates different components contained within, or connected with, different other components. It is to be understood that such depicted architectures are merely examples, and that in fact, many other architectures can be implemented that achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably coupleable" to each other to achieve the desired functionality. Specific examples of operably coupleable include, but are not limited to, physically mateable, physically interacting components, wirelessly interactable, wirelessly interacting components, logically interacting, logically interactable components, etc.

In an example embodiment, one or more components may be referred to herein as "configured to," "configurable to," "operable/operative to," "adapted/adaptable," "able to," "conformable/conformed to," etc. Such terms (e.g., "configured to") can generally encompass active-state components, or inactive-state components, or standby-state components, unless context requires otherwise.

The foregoing detailed description has set forth various embodiments of the devices or processes via the use of block diagrams, flowcharts, or examples. Insofar as such block diagrams, flowcharts, or examples contain one or more functions or operations, it will be understood by the reader that each function or operation within such block diagrams, flowcharts, or examples can be implemented, individually or collectively, by a wide range of hardware, software, firmware in one or more machines or articles of manufacture, or virtually any combination thereof. Further, the use of "Start," "End," or "Stop" blocks in the block diagrams is not intended to indicate a limitation on the beginning or end of any functions in the diagram. Such flowcharts or diagrams may be incorporated into other flowcharts or diagrams where additional functions are performed before or after the functions shown in the diagrams of this application. In an embodiment, several portions of the subject matter described herein is implemented via Application Specific Integrated Circuits (ASICs), Field Programmable Gate Arrays (FPGAs), digital signal processors (DSPs), or other integrated formats. However, some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry or writing the code for the software and/or firmware would be well within the skill of one skilled in the art in light of this disclosure. In addition, the mechanisms of the subject matter described herein are capable of being distributed as a program product in a variety of forms, and that an illustrative embodiment of the subject matter described herein applies regardless of the particular type of signal-bearing medium used to actually carry out the distribution. Non-limiting examples of a signal-bearing medium include the following: a recordable type medium such as a floppy disk, a hard disk drive, a Compact Disc (CD), a Digital Video Disk (DVD), a digital tape, a computer memory, etc.; and a transmission type medium such as a digital or an analog communication medium (e.g., a fiber optic cable, a waveguide, a wired communications link, a wireless communication link (e.g., transmitter, receiver, transmission logic, reception logic, etc.), etc.).

While particular aspects of the present subject matter described herein have been shown and described, it will be apparent to the reader that, based upon the teachings herein, changes and modifications can be made without departing from the subject matter described herein and its broader aspects and, therefore, the appended claims are to encompass within their scope all such changes and modifications as are within the true spirit and scope of the subject matter described herein. In general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). Further, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense of the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense of the convention (e.g., "a system having at least one of A, B, or C" would include but not be limited to systems that have A alone, B alone, C alone, A and B together, A and C together, B and C together, and/or A, B, and C together, etc.). Typically a disjunctive word or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, the operations recited therein generally may be performed in any order. Also, although various operational flows are presented in a sequence(s), it should be understood that the various operations may be performed in orders other than those that are illustrated, or may be performed concurrently. Examples of such alternate orderings include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

Based on the foregoing, it can be appreciated that a number of example embodiments are disclosed herein. For example, in one embodiment, a method can be implemented for optimizing public transportation schedules. Such a method can be includes steps, instructions, or operations such as, for example, evaluating shifts from current schedules associated with a public transportation system; determining an impact on waiting times based on the evaluating of the shifts from the current schedules; and optimizing schedules associated with the public transportation system based on the impact on the waiting times.

In some example embodiments, the step, instruction, or operation of evaluating the shifts from the current schedules further comprises can further involve exploring random shifts from the current schedules utilizing a parallel local search. In some example embodiments, the aforementioned parallel heuristic search can produce parallel heuristic search results.

In yet another example embodiment, the step, instruction, or operation of evaluating shifts from the current schedules associated with the public transportation system can further include a step, instruction, or operation of finding a shift of each transit trip among a plurality of transit trips associated with the current schedules so as to minimize an expected transfer waiting time among the waiting times.

In still another example embodiment, the step, instruction, or operation of evaluating shifts from current schedules associated with a public transportation system can further include steps, instructions, or operations for randomly selecting a subset of trips among a plurality of transit trips associated with the current schedules to offset; randomly selecting a perturbation of the offset within an adequate boundary; and evaluating an impact of the offset. In some example embodiments, optimizing the schedules can further include updating a best schedule among the schedules. In addition, in some example embodiments, a step, instruction, or operation can be implemented for running parallel instances with different seeds.

In still another example embodiment, a system for optimizing public transportation schedules can be implemented. Such a system can include one or more processors and a non-transitory computer-usable medium embodying computer program code. The computer-usable medium is capable of communicating with the one or more processors. The computer program code can include instructions executable by the aforementioned processor or processors and can be configured for: evaluating shifts from current schedules associated with a public transportation system; determining an impact on waiting times based on evaluating of the shifts from the current schedules; and optimizing schedules associated with the public transportation system based on the impact on the waiting times.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the following claims.

What is claimed is:

1. A method for improving a public transportation system by optimizing public transportation schedules, said method comprising:
    evaluating shifts from current schedules associated with a public transportation system, wherein said shifts include offsets comprising time shifts and wherein said evaluating of said shifts involves an evaluation of said offsets, said evaluation including computing a series of minimums in a distributed fashion;
    determining an impact of said shifts including said offsets on waiting times in said public transportation system based on said evaluating of said shifts from said current schedules associated with said public transportation system; and
    optimizing schedules associated with said public transportation system based on said impact of said shifts including said offsets on said waiting times, wherein said evaluating said shifts, said determining said impact of said shifts, and said optimizing said schedules improve the public transportation system and wherein said evaluating said shifts from said current schedules further comprises exploring random shifts from said current schedules utilizing a parallel local search with parallel iterations.

2. The method of claim 1 wherein said parallel heuristic search produces parallel heuristic search results.

3. The method of claim 1 wherein said evaluating shifts from said current schedules associated with said public transportation system, further comprises:
    finding a shift of each transit trip among a plurality of transit trips associated with said current schedules so as to minimize an expected transfer waiting time among said waiting times.

4. The method of claim 1 wherein evaluating shifts from current schedules associated with a public transportation system, further comprises:
    randomly selecting a subset of trips among a plurality of transit trips associated with said current schedules to offset;
    randomly selecting a perturbation of said offset within an adequate boundary; and
    evaluating an impact of said offset.

5. The method of claim 4 wherein optimizing said schedules further comprises updating a best schedule among said schedules.

6. The method of claim 4 further comprising running parallel instances with different seeds.

7. A system for improving a public transportation system by optimizing public transportation schedules, said system comprising:
    at least one processor; and
    a non-transitory computer-usable medium embodying computer program code, said computer-usable medium capable of communicating with said at least one processor, said computer program code comprising instructions executable by said at least one processor and configured for:
        evaluating shifts from current schedules associated with a public transportation system, wherein said shifts include offsets comprising time shifts and wherein said evaluating of said shifts involves an evaluation of said offsets, said evaluation including computing a series of minimums in a distributed fashion;
        determining an impact of said shifts including said offsets on waiting times in said public transportation system based on said evaluating of said shifts from said current schedules associated with said public transportation system; and
        optimizing schedules associated with said public transportation system based on said impact of said shifts including said offsets on said waiting times, wherein said evaluating said shifts, said determining said impact of said shifts, and said optimizing said schedules improve the public transportation system and wherein said evaluating said shifts from said current schedules further comprises exploring random shifts from said current schedules utilizing a parallel local search with parallel iterations.

8. The system of claim 7 wherein said parallel heuristic search produces parallel heuristic search results.

9. The system of claim 7 wherein said instructions for evaluating shifts from said current schedules associated with said public transportation system further comprise instructions configured for finding a shift of each transit trip among a plurality of transit trips associated with said current schedules so as to minimize an expected transfer waiting time among said waiting times.

10. The system of claim 8 wherein said instructions for evaluating shifts from current schedules associated with a public transportation system, further comprises instructions configured for:
- randomly selecting a subset of trips among a plurality of transit trips associated with said current schedules to offset;
- randomly selecting a perturbation of said offset within an adequate boundary; and
- evaluating an impact of said offset.

11. The system of claim 10 wherein said instructions for optimizing said schedules further comprise instructions configured for updating a best schedule among said schedules.

12. The system of claim 10 further comprising instructions configured for running parallel instances with different seeds.

13. A non-transitory processor-readable medium storing computer code representing instructions to cause a process for improving a public transportation system by optimizing public transportation schedules, said computer code comprising code to:
- evaluate shifts from current schedules associated with a public transportation system, wherein said shifts include offsets comprising time shifts and wherein said evaluate of said shifts involves an evaluation of said offsets, said evaluation including computing a series of minimums in a distributed fashion;
- determine an impact of said shifts including said offsets on waiting times in said public transportation system based on said evaluating of said shifts from said current schedules associated with said public transportation system; and
- optimize schedules associated with said public transportation system based on said impact of said shifts including said offsets on said waiting times, wherein said evaluate of said shifts, said determine of said impact of said shifts, and said optimize of said schedules improve the public transportation system and wherein said code to evaluate said shifts from said current schedules further comprises code for exploring random shifts from said current schedules utilizing a parallel local search with parallel iterations.

14. The non-transitory processor-readable medium of claim 13 wherein said parallel heuristic search produces parallel heuristic search results.

15. The non-transitory processor-readable medium of claim 13 wherein said code to evaluate shifts from said current schedules associated with said public transportation system further comprises code to find a shift of each transit trip among a plurality of transit trips associated with said current schedules so as to minimize an expected transfer waiting time among said waiting times.

16. The non-transitory processor-readable medium of claim 14 wherein said code to evaluate shifts from current schedules associated with a public transportation system, further comprises code to:
- randomly select a subset of trips among a plurality of transit trips associated with said current schedules to offset;
- randomly select a perturbation of said offset within an adequate boundary; and
- evaluate an impact of said offset.

17. The non-transitory processor-readable medium of claim 16 wherein said code to optimize said schedules further comprises code for updating a best schedule among said schedules.

* * * * *